US008962134B2

(12) United States Patent  
Pachl et al.

(10) Patent No.: US 8,962,134 B2
(45) Date of Patent: Feb. 24, 2015

(54) SEALANT ARTICLES AND COMPOSITIONS USEFUL THEREIN

(75) Inventors: Jeffrey T. Pachl, Holt, MO (US); Don K. Howard, Liberty, MO (US); Gradie C. Rorie, Ann Arbor, MI (US); Gregory A. Ferguson, Harrison Township, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 152 days.

(21) Appl. No.: 12/418,848

(22) Filed: Apr. 6, 2009

(65) Prior Publication Data

US 2009/0250166 A1    Oct. 8, 2009

Related U.S. Application Data

(63) Continuation of application No. PCT/US2007/021340, filed on Oct. 4, 2007.

(60) Provisional application No. 60/828,701, filed on Oct. 9, 2006.

(51) Int. Cl.
| | | |
|---|---|---|
| C08J 3/28 | (2006.01) |
| C08L 35/02 | (2006.01) |
| C09J 135/02 | (2006.01) |
| C09J 131/04 | (2006.01) |
| C08F 2/48 | (2006.01) |
| C08L 23/08 | (2006.01) |
| C09J 4/06 | (2006.01) |
| C09J 167/00 | (2006.01) |
| C09K 3/10 | (2006.01) |
| B32B 37/14 | (2006.01) |
| C08K 3/26 | (2006.01) |
| C08K 5/14 | (2006.01) |
| C08L 9/00 | (2006.01) |

(52) U.S. Cl.
CPC ............... *C09J 131/04* (2013.01); *C08F 2/48* (2013.01); *C08J 3/28* (2013.01); *C08L 23/0853* (2013.01); *C09J 4/06* (2013.01); *C09J 167/00* (2013.01); *C09K 3/10* (2013.01); *B32B 37/14* (2013.01); *C08K 3/26* (2013.01); *C08K 5/14* (2013.01); *C08L 9/00* (2013.01); *C09K 2200/062* (2013.01); *C09K 2200/0622* (2013.01); *C09K 2200/0655* (2013.01)
USPC ............... 428/345; 428/355 EP; 428/355 EN; 428/522; 156/330; 156/330.9; 156/332

(58) Field of Classification Search
None
See application file for complete search history.

(56) References Cited

U.S. PATENT DOCUMENTS

| | | | |
|---|---|---|---|
| 3,676,398 A | 7/1972 | D'Alelio |
| 3,700,643 A | 10/1972 | Smith et al. |
| 3,770,602 A | 11/1973 | D'Alelio |
| 4,018,851 A | 4/1977 | Baccei |
| 4,072,529 A | 2/1978 | Hoornstra et al. |
| 4,133,723 A | 1/1979 | Howard |
| 4,188,455 A | 2/1980 | Howard |
| 4,206,025 A | 6/1980 | Dufour et al. |
| 4,295,909 A | 10/1981 | Baccei |
| 4,309,526 A | 1/1982 | Baccei |
| 4,380,613 A | 4/1983 | Nativi |
| 4,439,600 A | 3/1984 | Moran, Jr. |
| 4,511,732 A | 4/1985 | Hicks |
| 4,560,579 A | 12/1985 | Siadat et al. |
| 4,568,405 A * | 2/1986 | Lin ........................ 156/307.3 |
| 4,574,138 A | 3/1986 | Moran, Jr. et al. |
| 4,605,465 A | 8/1986 | Morgan |
| 4,652,274 A | 3/1987 | Boettcher et al. |
| 4,710,539 A | 12/1987 | Siadat et al. |
| 5,002,976 A | 3/1991 | McConnell et al. |
| 5,496,685 A | 3/1996 | Farber et al. |
| 5,948,508 A | 9/1999 | Pastore et al. |
| 5,964,979 A | 10/1999 | George et al. |
| 6,030,701 A | 2/2000 | Johnson et al. |
| 6,136,398 A | 10/2000 | Willett et al. |
| 6,174,932 B1 | 1/2001 | Pachl et al. |
| 6,187,836 B1 | 2/2001 | Oxman et al. |
| 6,277,898 B1 | 8/2001 | Pachl et al. |
| 6,287,669 B1 | 9/2001 | George et al. |
| 6,461,691 B1 | 10/2002 | Taylor et al. |

(Continued)

FOREIGN PATENT DOCUMENTS

| | | |
|---|---|---|
| EP | 1749869 A1 | 2/2007 |
| JP | 60-235881 | 11/1985 |

(Continued)

OTHER PUBLICATIONS

International Search Report, International Application PCT/US2007/021340, dated Jan. 30, 2008.
Written Opinion, International Application PCT/US2007/021340, dated Jan. 30, 2008.
European Communication dated Oct. 7, 2010, extended Search Report for European patent application 07 83 9252.
Non-patent document from JPO in related case including pp. 194-197 of publication with partial English translation.
Hawley's Condensed Chemical Dictionary, Thirteenth Edition, p. 985.

*Primary Examiner* — Ramsey Zacharia
(74) *Attorney, Agent, or Firm* — Mary K. Cameron

(57) ABSTRACT

A sealant article useful for sealing a substrate surface having a first surface and a second surface is provided. The first surface comprises a deformable composition that is capable of conforming to a substrate surface when subjected to heat and/or pressure. The second surface of the sealant article has been at least partially cured by exposing said surface to an amount of radiation effective to induce at least partial curing of the second surface of the sealant article. Prior to such curing, the second surface also is comprised of the deformable composition. Such at least partial curing is effective to render the second surface less deformable than the first surface.

18 Claims, No Drawings

(56) References Cited

U.S. PATENT DOCUMENTS

| | | |
|---|---|---|
| 6,472,452 B2 | 10/2002 | Ruepping |
| 6,485,589 B1 | 11/2002 | Johnson et al. |
| 6,489,023 B1 | 12/2002 | Shinozaki et al. |
| 6,582,824 B1 | 6/2003 | Weigl et al. |
| 6,656,979 B1 | 12/2003 | Kitano et al. |
| 6,858,260 B2 | 2/2005 | Taylor et al. |
| 6,887,917 B2 | 5/2005 | Yang et al. |
| 6,991,237 B2 | 1/2006 | Kassa et al. |
| 7,026,635 B2 | 4/2006 | Rangwalla et al. |
| 7,449,232 B2 | 11/2008 | Rangwalla |
| 7,521,093 B2 | 4/2009 | Finerman et al. |
| 2003/0001108 A1 | 1/2003 | Rangwalla et al. |
| 2003/0235659 A1 | 12/2003 | Rangwalla et al. |
| 2004/0131844 A1 | 7/2004 | Shinozaki |
| 2004/0197571 A1 | 10/2004 | Hiroshige et al. |
| 2005/0065310 A1 | 3/2005 | Wang et al. |
| 2005/0123869 A1 | 6/2005 | Shimomura et al. |
| 2005/0224173 A1 | 10/2005 | Kitano et al. |
| 2005/0269840 A1 | 12/2005 | Finerman et al. |
| 2006/0113715 A1 | 6/2006 | Schwab et al. |
| 2007/0096056 A1 | 5/2007 | Takeuchi et al. |

FOREIGN PATENT DOCUMENTS

| | | |
|---|---|---|
| JP | 02279710 A | 11/1990 |
| JP | 03007776 A | 1/1991 |
| JP | 06116546 A | 4/1994 |
| JP | 07228860 A | 8/1995 |
| JP | 08259907 A | 10/1996 |
| JP | 10152672 A | 6/1998 |
| JP | 11-021525 | 1/1999 |
| JP | 2002501109 A | 1/2002 |
| WO | 2004027502 A1 | 4/2004 |
| WO | WO 2005/052021 A1 | 6/2005 |
| WO | WO 2006113715 A2 * | 10/2006 |

* cited by examiner

US 8,962,134 B2

SEALANT ARTICLES AND COMPOSITIONS USEFUL THEREIN

This application is a continuation under 35 U.S.C. Sections 365(c) and 120 of International Application No. PCT/US2007/021340, filed Oct. 4, 2007 and published on Apr. 17, 2008 as WO 2008/045295, which claims priority from U.S. Provisional Patent Application Ser. No. 60/828,701 filed Oct. 9, 2006, which are incorporated herein by reference in their entirety.

FIELD OF THE INVENTION

This invention pertains to sealant articles useful for sealing and protecting joints and the like, wherein the sealant articles are prepared using deformable compositions capable of being radiation cured to provide a deformation-resistant and constraining outer surface.

DISCUSSION OF THE RELATED ART

Sealants currently are employed in a wide variety of industrial applications. For example, the automotive industry utilizes sealants between and upon metal seams and welds. One specific sealant application involves the use of a sealant upon the welds in the so-called roof ditches which are formed when joining the side panels of a vehicle body to the roof of the vehicle. Conventionally, the roof ditch weld is covered with a bead or strip of a plastic (e.g., PVC) molding that is covered with a metal strip and painted. In recent years, alternative approaches have been proposed. For example, U.S. Pat. No. 6,030,701 describes sealant articles comprising a melt-flowable composition and a dimensionally stable film for controlling the melt-flow behavior of the melt-flowable composition to substantially confine the melt-flowable composition to the desired area of the roof ditch area to which the sealant article has been applied. In U.S. Pat. Nos. 6,461,691, 6,277,898, 6,174,932, and 6,858,260, radiation curable, flexible, paintable compositions produced from epoxy compounds and one or more polyols are suggested as roof ditch sealants.

In many cases, sealing a substrate surface, especially the substrate surfaces typically encountered in vehicle manufacture, is quite challenging since a variety of different requirements must be simultaneously met. For example, welded metal joints such as those commonly present in vehicle roof ditches often are quite uneven, due to weld dimples, projections resulting from the design of the parts being joined by welding, and so forth. Conventional automotive sealants and mastics are typically formulated to be relatively soft and flexible so that they may be readily conformed to such surfaces and form an effective seal (e.g., prevent water and other liquids from penetrating to the joint). However, these characteristics also result in the outer surface of the sealant or mastic being highly susceptible to deformation due to trapped air, irregularities or projections in the substrate surface, or external forces. In some cases, blow-through of the sealant or mastic may occur, which severely compromises the effectiveness and appearance of the seal that is sought to be achieved. As a result, it is often difficult to provide and maintain a smooth, even, and cosmetically attractive top surface once the sealant or mastic has been applied to the substrate surface. However, using a less easily deformable sealant or mastic composition would interfere with the ability to effectively seal the substrate surface.

SUMMARY OF THE INVENTION

In one aspect of the invention, a sealant article useful for sealing a substrate surface is provided. The sealant article has a first surface and a second surface, wherein the first surface is comprised of a deformable composition that is capable of conforming to the substrate surface when subjected to heat and/or pressure. The second surface of the sealant article has been at least partially cured by exposing the surface to an amount of radiation effective to induce at least partial curing of the second surface. The second surface prior to said curing is also comprised of the deformable composition. The at least partial curing is effective to render the second surface less deformable than the first surface.

The deformable composition capable of being cured by exposure to radiation may be comprised of at least one thermoplastic, at least one (meth)acrylate-functionalized monomer or oligomer, at least one thermally activatable free radical initiator, and at least one filler. A substrate may be sealed using such sealant article, wherein the sealant article is applied to the substrate surface such that the first surface comprised of the deformable composition is in at least partial contact with the substrate surface.

DETAILED DESCRIPTION OF CERTAIN EMBODIMENTS OF THE INVENTION

The present invention involves the use of a sealant article to provide protective and/or aesthetically pleasing features to a substrate. The sealant article is prepared using a deformable composition that initially is thermoplastic in character and thus can be readily formed after heating into a desired shape such as relatively thin, flat sheet, tape, strip or the like. The deformable composition is also capable of being at least partially cured by irradiation. At least one surface of the sealant article, such as the surface that ultimately is to be positioned facing away from the substrate surface, is exposed to an amount of radiation (such as ultraviolet light or electron beam radiation) effective to achieve the desired extent of curing (crosslinking) of the deformable composition on the selected surface of the sealant article. The selected surface is thereby rendered more resistant towards being deformed by external forces such as projections on the substrate surface, air trapped under the sealant article once applied to the substrate surface, or the pressure exerted by fingers or tools in applying the sealant article to a surface. In certain embodiments, the deformable composition is cured sufficiently to make the selected surface of the sealant article tack-free (non-tacky) and/or non-thermoplastic (i.e., not capable of being melted). Curing a surface of the sealant using radiation provides the additional advantage that the less cured or uncured deformable composition in the remainder of the sealant article remains thermoplastic and capable of flowing when heated, but the flow of the deformable composition is restricted or constrained by the radiation-cured surface, which exhibits less or even no flow when heated. This feature enables the sealing of the substrate surface by the sealant article to be controlled, thereby minimizing dripping or running of the deformable composition and spread of the deformable composition to areas of the substrate surface where sealant is not desired. The radiation-cured surface of the sealant article also imparts a smooth, aesthetically pleasing appearance to the substrate surface, since it enables the sealant article to effectively cover and mask surface imperfections. The present invention does not require co-extrusion or lamination steps in the assembly of the sealant article and thus represents an advance over known sealants incorporating dimensionally stable carrier films, the manufacture of which can be complicated.

The irradiation step is controlled such that at least one other surface of the sealant article (such as the surface that ultimately is to be brought into contact with the substrate surface) remains deformable and therefore capable of being brought into close conformance with the substrate surface, thereby providing an effective seal. In one aspect of the invention, the deformable composition proximate to such other surface remains flowable when heated. Thus, when the sealant article is placed over the substrate and heated, the surface of the sealant article applied to the substrate surface softens and bonds to the substrate (such surface thereby functions like a hot melt adhesive), with the deformable composition resolidifying when cooled to room temperature. In another aspect of the invention, the deformable composition is capable of being thermally cured by incorporating one or more heat-activated curing or crosslinking agents which, once activated by heating, react with and/or catalyze reaction of other components of the deformable composition, thereby forming a thermoset polymeric matrix which is resistant to further deformation. In one particularly desirable variation of the invention, the deformable composition is formulated so that it remains sufficiently thermoplastic to permit the deformable composition to flow when heated up to a certain temperature and/or for a certain limited period of time, but then undergo crosslinking/curing when heated to a higher temperature or for a longer period of time. In still another embodiment, the components of the deformable composition are selected to render a non-radiation cured surface of the composition sufficiently tacky at room temperature such that the surface adheres to the substrate surface by application of pressure to the sealant article. In this embodiment, the deformable composition thus functions as a pressure-sensitive adhesive.

The present invention may be used in a number of industrial applications. For example, the sealant article can be utilized in a process to seal metal joints in automobiles. The sealant article is applied over the joint to be sealed. Complete sealing and bonding would be obtained because at least a portion of the deformable composition flows prior to hardening. As a result of the controlled flow of the edges of the sealant article, an aesthetic outer surface appearance is achieved. The exposed surface(s) of the sealant article can then be painted or otherwise decorated to match the vehicle body. The sealant articles of the present invention are useful in sealing a variety of discontinuities such as overlap joints or seams, butt joints or seams, depressions, indentations, holes, gaps, channels, slots, and manufacturing defects such as those produced when fabricating metal articles and the like.

In one embodiment of the invention, the surface of the sealant article that is to be applied to the substrate surface is tacky or pressure sensitive and is initially protected by a temporary substrate such as a disposable liner or release paper. Such a temporary substrate blocks dirt and other substances from contaminating the sealant article surface and interfering with adhesion of the sealant article to the substrate surface. Additionally, a temporary substrate may facilitate storage and handling of the sealant article (for example, the sealant article could be in the form of a tape that is wound upon itself or a sheet that is stacked upon another sheet with a layer of the temporary substrate inbetween). Immediately before applying the sealant article to the substrate surface, the temporary substrate is removed to expose the sealant article surface or surfaces to be contacted with the substrate surface.

The sealant article can be placed in a roof ditch on a vehicle before it is painted to conceal unsightly flaws in the metal, spot welds, and the step joint where the sheet metal of the roof is welded to the sheet metal of the vehicle body.

In one specific embodiment, the sealant article is cut or otherwise formed into a strip having a width equal to or slightly greater than the width of the roof ditch and a length equal to the length of the ditch. The sealant article is placed within the roof ditch; typically, pressure is applied so as to bring the non-radiation cured surface of the sealant article into at least partial contact with the roof ditch surface. The roof ditch surface may be unprimed, unprimed with a portion sealed with conventional sealers, primed with conventional primers, or primed and painted. Typically, the roof ditch surface is primed with an electrodeposition coating prior to application of the strip. The strip is then heated while in the ditch (for example, while the vehicle is being passed through a paint cure oven) so the deformable composition proximate to the surface of the roof ditch flows and levels out over any imperfections and the step joint in the roof ditch, thereby creating a smooth, aesthetically pleasing appearance within the ditch. At the same time, the sealant article also adheres to the interior surfaces of the roof ditch and provides a protective seal in the ditch to prevent rain water, dirt, snow, and so forth from penetrating the roof ditch and causing rusting or corrosion. In the embodiment where the strip-shaped sealant article has a width slightly greater than the width of the roof ditch, the positioned and adhered strip can take on a concave configuration along the length of the roof ditch to provide a channel to carry water off the roof of the vehicle.

The vehicle, with the sealant article in place, may be painted (including optionally also a protective clear coat) and put through an oven cure cycle at about 120 to about 200 degrees C. for about 10 to about 60 minutes. The deformable composition may be formulated so that it melt flows to a desired extent and/or is thermally cured through activation of curing agents/catalysts during such oven cure cycle.

The deformable composition may be formed into the desired sealant article shape such as a sheet using conventional forming techniques, including extruding the deformable composition through a heated die; molding the deformable composition while heated in a mold of the desired configuration; heating the deformable composition to a suitable melt temperature and knife coating onto a release liner; curtain coating the deformable composition while molten; or dispersing the material in a solvent, coating onto a release liner, and drying the solvent. If the forming method selected involves heating and the deformable composition contains a latent (heat activated) curing agent or catalyst, care should be taken to keep the temperature of the deformable composition below the minimum temperature at which the curing agent or catalyst will significantly crosslink or cure the deformable composition. Once formed into a sheet, the deformable composition can be further processed to provide the sealant article of the desired dimensions, such as by die cutting or slitting the sheet. Alternatively, the deformable composition can be directly shaped into the desired form for placement on a substrate surface.

The thickness of the sealant article will vary depending upon its intended end use. For most sealing applications, it is desirable to have the sealant article thick enough to provide sufficient material to flow and level out over dents, bumps, and other surface imperfections or to fill in gaps between joints. Useful thicknesses have been found to be in the range of about 0.05 mm to about 25 mm or about 0.5 to about 5 mm, for example. The sealant article need not be uniform in thickness.

The shape of the sealant article can be varied to match the general area and dimensions of the substrate surface which is desired to be covered and sealed (e.g., the area proximate to a joint between metal panels, such that the sealant article bridges the joint).

The present invention may be practiced using any of a wide variety of substrates, including, for example, substrates comprised of metal, wood and other cellulosic materials, thermoset materials, plastics, glass, concrete, ceramics, stone, and the like. In one especially desirable aspect of the invention, the substrate is comprised of one or more metals such as steel, including galvanized steel, stainless steel, and cold rolled steel as well as aluminum. The surface of the metal substrate to which the sealant article is to be applied may be bare, pretreated (conversion coated), primed, and/or painted. In the case of metal substrates, the sealant articles of the present invention may be applied upon welded joints, including joints formed by spot welding, wire welding, laser welding and the like.

Typically, one or more surfaces of the sealant article are radiation cured after at least partially shaping or forming the sealant article and before applying the sealant article to the surface of the substrate desired to be sealed. For example, the deformable composition may be formed into a relatively flat, thin sheet by extrusion or other suitable technique. The sheet is exposed on one side to radiation such as ultraviolet light to cure the surface of the sheet on that side. The sheet is then die cut or slit to provide the sealant article, which is positioned onto the substrate surface in the desired location with the other side of the sealant article that has not been cured by radiation being directed towards the substrate surface.

In one embodiment of the invention, a relatively thin skin is formed upon the surface of the sealant article that has been exposed to radiation, as a result of the radiation-induced crosslinking or curing of at least certain components in the deformable composition, e.g., the (meth)acrylate-functionalized oligomer(s) and/or monomer(s). The surface skin serves to stabilize the shape of the sealant article, particularly when the sealant article is heated to a temperature effective to soften or melt the portion of the deformable composition in the sealant article that remains thermoplastic and substantially non-crosslinked.

Surface curing of the deformable composition can be initiated using any suitable source of radiation, such as ultraviolet or electron beam radiation. Where the radiation source emits ultraviolet light, it will generally be desirable to include one or more photoinitiators in the deformable composition. If electron beam radiation is utilized, the presence of a photoinitiator in the deformable composition is generally not necessary.

One or more selected surfaces of the sealant article are exposed to sufficient radiation in the form of ultraviolet light or electron beam radiation to cause reaction of the radiation-reactive components of the deformable composition (e.g., the (meth)acrylate-functionalized oligomers and/or monomers) on the surface. The reactive components polymerize and/or cross-link so as to surface-harden or surface-cure the deformable composition. Preferably, the amount of radiation is sufficient to induce reaction of at least 90%, more preferably at least 95%, most preferably all or essentially all of the radiation-reactive components in that portion of the deformable composition immediately proximate to the selected surface(s).

At the same time, the amount of radiation and the manner in which the sealant article is exposed to the radiation are controlled so that at least one surface of the sealant article (in particular, the sealant article surface(s) to be applied to the substrate surface(s) desired to be sealed) remains substantially or completely uncured by the radiation. That is, the deformable composition immediately proximate to such surface(s) does not cure or crosslink to a significant extent and thus remains deformable, i.e., more deformable than the surface(s) which has or have been radiation cured.

The radiation-curable compositions utilized in the present invention can be cured using conventional techniques for radiation curing, such as irradiation of the composition layer on the substrate surface using UV (ultraviolet) light from low, medium and/or high pressure mercury vapor lamps, He—Cd and Ar lasers, Xenon arc lamps, or other suitable source of radiation. The UV light may have a wavelength of from about 200 to about 450 nanometers. The source of the electron beams (highly accelerated electrons) can be a particle beam processing device. Such devices are well-known in the art and are described, for example, in published U.S. applications 2005-0233121, 2004-0089820, 2003-0235659, and 2003-0001108, each of which is incorporated herein by reference in its entirety. Suitable electron beam emitting devices are available, for example, from Energy Sciences, Inc.

The amount of radiation necessary to cure the deformable composition surface(s) to the desired extent will of course depend on the angle of exposure to the radiation, the thickness of the deformable composition, and the concentration and reactivity of the functional groups present in the radiation-reactive components of the deformable composition. For example, an ultra-violet source with a wavelength between 200 and 300 nm (e.g. a filtered mercury arc lamp) or an electron beam source may be directed at a sealant article carried on a conveyor system which provides a rate of passage past the radiation source appropriate for the radiation absorption profile of the deformable composition (which profile is influenced by the degree and depth of surface cure desired and the rate of polymerization/crosslinking of the composition).

As previously mentioned, in a particularly preferred embodiment of the invention the deformable composition is comprised of at least one thermoplastic, at least one (meth)acrylate-functionalized monomer or oligomer, at least one thermally activatable free radical initiator, and at least one filler. Optionally, the deformable may contain additional components such as tackifiers, photoinitiators, and other additives. Such compositions may desirably be formulated so as to be radiation-curable, thermoplastic (substantially solid or non-flowing at room temperature, but capable of melting or softening to at least some extent when heated up to a certain temperature), as well as heat-curable once heated past a certain temperature and/or for a certain period of time. In one embodiment, the surface of the deformable composition is tacky at room temperature but following exposure to an amount of radiation effective to achieve at least partial curing of the surface becomes reduced in tackiness or even entirely non-tacky at room temperature. Preferably, the melting point (as determined by DSC) or softening point (as determined by a ring and ball test) of the non-irradiated deformable composition is at least 50 degrees C. In one embodiment, the components of the deformable composition such that the composition remains thermoplastic within the temperature range of from about 60 degrees C. to about 100 degrees C., but then becomes thermoset (thermally crosslinked) when heated to a higher temperature (e.g., from about 120 degrees C. to about 200 degrees C.).

Thermoplastics

In one embodiment of the invention, the deformable composition is comprised of one or more thermoplastics (i.e., thermoplastic polymers). Polyethylenes represent a class of thermoplastics particularly suitable for use in the present invention. The term polyethylene is understood herein to mean both homo- and copolymers of ethylene.

Exemplary comonomers (monomers which could be copolymerized with ethylene) include:

alpha-olefins, particularly those having from 3 to 30 carbon atoms (e.g., propylene, 1-butene, 1-pentene, 3-methyl-1- butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene; such alpha-olefins can be used alone or as a mixture of two or of more than two;

unsaturated carboxylic acid esters, such as, for example, alkyl (meth)acrylates, it being possible for the alkyl groups to have up to 24 carbon atoms; examples of alkyl acrylates or methacrylates are in particular methyl methacrylate, methyl acrylate, ethyl acrylate, n-butyl acrylate, isobutyl acrylate and 2-ethylhexyl acrylate;

unsaturated carboxylic acids, such as, for example, acrylic acid and methacrylic acid;

vinyl esters of saturated carboxylic acids, such as, for example, vinyl acetate or vinyl propionate; and dienes, such as, for example, 1,4-hexadiene, 1,4-butadiene, isoprene.

The polyethylene can comprise two or more of the above comonomers.

Mention may be made, as examples of polyethylenes, of:
low-density polyethylene (LDPE);
high-density polyethylene (HDPE);
linear low-density polyethylene (LLDPE);
very low-density polyethylene (VLDPE);
polyethylene obtained by metallocene catalysis;
ethylene/alkyl(meth)acrylate copolymers (such as ethylene/methyl acrylate and ethylene ethyl acrylate copolymers);
ethylene/(meth)acrylic acid copolymers;
ethylene/(meth)acrylic acid copolymers;
ethylene/vinyl acetate copolymers; and
ethylene/vinyl acetate/(meth)acrylic acid copolymers.

Copolymers of ethylene and vinyl acetate represent an especially useful type of thermoplastic that can be used in the deformable compositions of the present invention. As is well known in the art, the molar ratio of ethylene:vinyl acetate and the molecular weight of such copolymers may be varied so as to alter the properties of the copolymer such as melting point, ring and ball softening point melt flow index, and the like. Different ethylene/vinyl acetate copolymers may be blended to achieve a particular desired balance of properties. Termonomers, such as unsaturated carboxylic acids, can also be introduced to further vary or control the characteristics of the thermoplastic.

In certain embodiments of the invention, ethylene/vinyl acetate copolymers (including ethylene/vinyl acetate/unsaturated carboxylic acid terpolymers) or mixture of ethylene/vinyl acetate copolymers having one or more of the following characteristics are used in the deformable composition: about 23 to about 36 weight percent vinyl acetate, melt index of about 200 to about 1000 g/10 min at 190 degrees C., 2.16 kg (as measured by ASTM 1238), melting point of from about 55 to about 75 degrees C. (as measured by DSC), and/or ring and ball softening point of from about 70 to about 90 degrees C. (as measured by ASTM E28).

Suitable thermoplastics also include polycaprolactones and polyesters (including polyesters containing functional groups such as terminal hydroxyl and/or carboxylic acid groups) that may be amorphous or semi-crystalline at room temperature. A material that is "amorphous" has a glass transition temperature but does not display a measurable crystalline melting point as determined on a differential scanning calorimeter (DSC). A material that is "semi-crystalline" displays a crystalline melting point as determined by DSC, preferably with a maximum melting point of about 200 degrees C. The melting point of the polyester may be varied as needed to achieve the desired melt flow characteristics in the deformable composition. For example, the melting point of the polyester may be selected to be within the range of from about 50 degrees C. to about 150 degrees C.

The preferred polyesters are solid at room temperature. Typically, the polyesters have a number average molecular weight of about 7500 to 200,000, e.g., from about 10,000 to 50,000, or, e.g., from about 15,000 to 30,000.

Thermoplastic polyesters useful in the invention comprise the reaction product of dicarboxylic acids (or their diester or dihalo equivalents) and diols. The diacids (or diester or dihalo equivalents) can be saturated aliphatic acids containing from 4 to 12 carbon atoms (including branched, unbranched, or cyclic materials having 5 to 6 carbon atoms in a ring) and/or aromatic acids containing from 8 to 15 carbon atoms. Examples of suitable aliphatic acids are succinic, glutaric, adipic, pimelic, suberic, azelaic, sebacic, 1,12-dodecanedioic, 1,4-cyclohexanedicarboxylic, 1,3-cyclopentanedicarboxylic, 2-methylsuccinic, 2-methylpentanedioic, 3-methylhexanedioic acids, and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylthioether dicarboxylic acid, and 4,4'-diphenylamine dicarboxylic acid. Preferably the structure between the two carboxyl groups in the diacids contains only carbon and hydrogen, and more preferably, the structure is a phenylene group. Blends of the foregoing diacids may be used.

The diols include branched, unbranched, and cyclic aliphatic diols having from 2 to 12 carbon atoms. Examples of suitable diols include ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, cyclobutane-1,3-di(2'-ethanol), cyclohexane-1,4-dimethanol, 1,10-decanediol, 1,12-dodecanediol, and neopentyl glycol. Long chain diols including poly(oxyalkylene)glycols in which the alkylene group contains from 2 to 9 carbon atoms, preferably 2 to 4 carbon atoms, may also be used, such as polyethylene glycol, polypropylene glycol, and polytetramethylene glycol. Blends of the foregoing diols may be used.

Useful thermoplastic polyesters that are commercially available include various saturated linear, semi-crystalline copolyesters available from Degussa America, Inc. such as DYNAPOL S1401, DYNAPOL S1402, DYNAPOL S1358, DYNAPOLS1359, DYNAPOL S1227, and DYNAPOL S1229. Useful saturated, linear amorphous copolyesters available from Degussa America, Inc. include DYNAPOL S1313 and DYNAPOL S1430.

The amount of thermoplastic present should be sufficient to assist in rendering the deformable composition solid at room temperature and preferably melt-flowable at an elevated temperature. Typically, the deformable composition contains at least about 10 weight percent but no greater than about 60 weight percent (e.g., 20-45 weight percent) thermoplastic. More than one type of thermoplastic can be present; for example, a combination of a polyethylene and a polyester can be utilized. All amounts herein, unless otherwise stated, are expressed in terms of percent by weight of the total weight of the deformable composition.

(Meth)Acrylate-Functionalized Monomers and Oligomers

The deformable compositions of the present invention may comprise one or more radiation curable (meth)acrylate-functionalized oligomers. These are oligomeric substances of low to moderate molecular weight (e.g., from about 300 to about 10,000 number average molecular weight) having one or more acrylate and/or methacrylate groups attached to the oligomeric backbone. The (meth)acrylate functional groups may be in a terminal position on the oligomer and/or may be distributed along the oligomeric backbone. In one embodiment of the invention, at least a portion of the (meth)acrylated functionalized oligomers have two or more (meth)acrylate functional groups per molecule. Examples of such oligomers include (meth)acrylate-functionalized urethane oligomers (sometimes also referred to as "acrylated urethanes" or "urethane (meth)acrylates") such as (meth)acrylate-functionalized polyester urethanes and (meth)acrylate-functionalized polyether urethanes, (meth)acrylate-functionalized polyepoxide resins, (meth)acrylate-functionalized polybutadienes, (meth)acrylic polyol (meth)acrylates (also known as "poly (meth)acrylate (meth)acrylates" or "(meth)acrylated poly (meth)acrylates"), polyester (meth)acrylate oligomers (also known as "polyester (meth)acrylates"), polyamide (meth) acrylate oligomers, polyether (meth)acrylate oligomers (also known as "polyester (meth)acrylates") polysiloxane (meth) acrylate oligomers and the like. Such (meth)acrylate-functionalized oligomers and their methods of preparation are disclosed in, for example, U.S. Pat. Nos. 4,574,138; 4,439, 600; 4,380,613; 4,309,526; 4,295,909; 4,018,851, 3,676,398; 3,770,602; 4,072,529; 4,511,732; 3,700,643; 4,133,723; 4,188,455; 4,206,025; 5,002,976; and published U.S. applications 2004/0127594 and 2005/0065310. Such materials are available from numerous commercial sources, including the UVITHANE resins from Morton International, certain oligomers sold under the brand name PHOTOMER by Cognis Corporation, the CN oligomer resins from Sartomer Company, the GENOMER resins from Rahn Inc., and the EBECRYL resins from the Cytec Surface Specialties Division of Cytec Industries, Inc.

Suitable (meth)acrylate-functionalized monomers which may be present in the radiation-curable deformable composition include monomers having single (meth)acrylate groups such as tetrahydrofurfuryl (meth)acrylate, hydroxyethyl (meth)acrylate, hydroxypropyl (meth)acrylate, isobornyl (meth)acrylate, methyl (meth)acrylate, ethyl (meth)acrylate, isopropyl (meth)acrylate, isooctyl (meth)acrylate, octyl (meth)acrylate, decyl (meth)acrylate, (meth)acrylic acid, n-hexyl (meth)acrylate, stearyl (meth)acrylate, allyl (meth) acrylate, 2(2-ethoxyethoxy)ethyl (meth)acrylate, 2-phenoxyethyl (meth)acrylate, ethoxylated nonyl phenol (meth)acrylates, (meth)acrylated monomers such as those described in U.S. Pat. No. 4,652,274, monomethoxy tripropylene glycol monoacrylate (available from Cognis Corporation under the designation PHOTOMER 8061), neopentylglycol propoxylate (2) in ethylether monoacrylate (available from Cognis Corporation under the designation PHOTOMER 8127), and the like. Other suitable (meth)acrylate-functionalized monomers include carboxylic acid-functionalized ester-containing (meth)acrylate monomers, e.g., compounds containing at least one carboxylic acid group (—$CO_2H$), at least one ester linkage (in addition to at least one acrylate or methacrylate group) and at least one acrylate or methacrylate group per molecule. Such substances are well-known in the art and may be prepared using any suitable synthetic method. For example, one such method involves reacting a compound containing both a hydroxyl group and a (meth)acrylate group with an anhydride. Carboxylic acid-functionalized ester-containing (meth)acrylate monomers suitable for use in the present invention are available from commercial sources, including, for example, ECX 4046 from Cognis Corporation and the series of specialty oligomers sold by the Sartomer Company under the brand name SARBOX.

Suitable monomers having plural (meth)acrylate functionality (i.e., two or more (meth)acrylate groups per molecule) include, for example, 1,3-butylene glycol di(meth)acrylate, diethylene glycol di(meth)acrylate, 1,6-hexanediol di(meth) acrylate, neopentyl glycol di(meth)acrylate, triethylene glycol di(meth)acrylate, tetraethylene glycol di(meth)acrylate, dipropylene glycol di(meth)acrylate, tripropylene glycol di(meth)acrylate, trimethylol propane ethoxylate tri(meth) acrylate, pentaerythritol tetra(meth)acrylate, tripropylene glycol di(meth)acrylate, trimethylol propane tri(meth)acrylate, ethoxylated bisphenol A di(meth)acrylates, ethoxylated hexanediol di(meth)acrylates, tris(2-hydroxyethyl) isocyanurate tri(meth)acrylate, ditrimethylol propane tetra(meth) acrylate, dipentaerythritol penta(meth)acrylate, propoxylated glycerol tri(meth)acrylates, pentaerythritol tri(meth) acrylate, and the like. In one embodiment of the invention, the deformable composition comprises one or more alkoxylated polyol poly(meth)acrylates containing at least three (meth) acrylate groups per molecule. The polyol may be an organic compound containing three or more hydroxyl groups trimethylolethane, trimethylolpropane, pentaerythritol, dipentaerythritol, sugar alcohols, or the like. The polyol is reacted with one or more alkylene oxides such as ethylene oxide or propylene oxide (typically, from about 1 to about 20 moles of alkylene oxide per mole of polyol) to form an alkoxylated polyol, then esterified with acrylic acid, methacrylic acid, or a derivative thereof to obtain the alkoxylated polyol poly (meth)acrylate.

Epoxy (meth)acrylates, including aromatic and aliphatic epoxy (meth)acrylates, are one especially preferred class of compounds suitable for use in the deformable compositions of the present invention. Epoxy (meth)acrylates are the beta-hydroxy esters which are generated by the reaction of acrylic acid and/or methacrylic acid (or an equivalent thereof, such as an anhydride) with an epoxy compound, preferably an epoxy compound having an epoxy functionality of two or greater. Suitable epoxy (meth)acrylates include the relatively low viscosity epoxy (meth)acrylates derived from diglycidyl ethers obtained by reaction of epichlorohydrin with an aliphatic alcohol containing two or more hydroxyl groups per molecule. Suitable aliphatic alcohols include, for example, glycols such as ethylene glycol, 1,2-propanediol, 1,3-propanediol, 1,2-butanediol, 1,4-butanediol, 1,6-hexanediol, neopentyl glycol and other linear and branched C2-C10 aliphatic diols, triols such as glycerin, trimethyolpropane, trimethylolethane, butanetriols, pentanetriols, and the like, tetrols such as pentaerythritol, as well as other polyfunctional alcohols such as dipentaerythritol, sugar alcohols and the like and alkoxylated derivatives thereof (where the alcohol has been reacted with an alkylene oxide such as ethylene oxide or propylene oxide, including both oligomeric species such as diethylene glycol or tripropylene glycol as well as polymeric species such as polyethylene glycols or polypropylene glycols or block, capped or random copolymers of ethylene oxide and propylene oxide). The alcohol may also be an aromatic alcohol such as bisphenol A, bisphenol F, or the like. The epoxy compound reacted with the (meth)acrylic acid may also be an epoxidized unsaturated triglyceride such as epoxidized soybean oil or epoxidized linseed oil. Preferably, all or essentially all of the epoxy groups on the epoxy compound are ring-opened with the (meth)acrylic acid. Suitable preferred epoxy (meth)acrylates thus have two, three, or more (meth)acrylate groups and two, three, or more hydroxyl groups per molecule. Specific illustrative examples of suitable epoxy compounds include bisphenol A diglycidyl ethers, bisphenol F diglycidyl ethers, hexanediol diglycidyl ethers, neopentyl glycol diglycidyl ethers, and butanediol diglycidyl ethers.

The deformable compositions of the present invention contain one or more urethane (meth)acrylate oligomers. The use of such urethane (meth)acrylate oligomers in place of epoxy (meth)acrylates has been found to significantly improve the moisture/humidity resistance of the deformable composition. Absorption of water into the deformable composition is generally undesirable, since a composition containing absorbed water tends to exhibit foaming during baking or curing. Urethane (meth)acrylate oligomeric materials contain at least one urethane linkage (in some embodiments, two or more urethane linkages) within the backbone of the oligomeric molecule and at least one acrylate and/or methacrylate functional groups (in some embodiments, two or more acrylate and/or methacrylate functional groups) pendent to the oligomeric molecule. The (meth)acrylate functional groups provide unsaturated double bonds capable of reaction when the deformable composition is exposed to radiation, thereby inducing curing of the composition. Typically, the urethane (meth)acrylate oligomer is liquid at room temperature or at least is liquid at the temperature at which the deformable composition is to be processed, although higher melting oligomers which are solubilized by the other components of the adhesive may also be used. The (meth)acrylate functional group(s) may be on the terminal position(s) of the oligomeric molecule and/or distributed along the backbone of the oligomeric molecule. Typically, the number average molecular weight of the urethane (meth)acrylate oligomer is from about 1000 to about 6000.

Urethane (meth)acrylate oligomers are well-known in the art and may be readily synthesized by a number of different procedures. For example, a polyfunctional alcohol may be reacted with a polyisocyanate (preferably, a stoichiometric excess of polyisocyanate) to form an NCO-terminated preoligomer, which is thereafter reacted with a hydroxy-functional (meth)acrylate. The polyfunctional alcohol may be any compound containing two or more OH groups per molecule and may be a monomeric polyol (e.g., a glycol), a polyester polyol, a polyether polyol, a (meth)acrylic polyol or the like. The urethane (meth)acrylate oligomer in one embodiment of the invention is an aliphatic urethane (meth)acrylate oligomer. In another embodiment of the invention, the urethane (meth)acrylate oligomer is a polyester urethane (meth)acrylate oligomer.

For example, a polyester polyol may be prepared by a condensation polymerization involving one or more diols and one or more diacids, anhydrides or diesters, with the stoichiometry of the reactants and the reaction conditions adjusted so as to provide terminal OH groups on the polyester thereby formed. The polyester polyol molecular weight may be, for example, from about 300 to about 10,000. Suitable diols include, for example, aliphatic glycols such as ethylene glycol, propane-1,2-diol, propane-1,3-diol, 2-methyl-1,3-propanediol, neopentyl glycol, 1,4-butanediol, 2,3-butanediol, 1,6-hexanediol, and the like. Suitable diacids and diesters include aliphatic and aromatic dicarboxylic acids and esters thereof such as, for example, succinic acid, adipic acid, suberic acid, azelaic acid, glutaric acid, glutaric anhydride, phthalic acid, isophthalic acid, terephthalic acid, phthalic anhydride, tetrahydrophthalic anhydride, maleic acid, maleic anhydride, fumaric acid, dimer fatty acids, and mixtures thereof. The hydroxyl groups of the polyester polyol may then be reacted with an aliphatic or aromatic diisocyanate, preferably in stoichiometric excess so as to provide an isocyanate-tipped preoligomer. Suitable diisocyanates include, but are not limited to, diphenylmethane diisocyanate (MDI) isomers, hydrogenated MDI isomers, xylylene diisocyanate, tetramethyl xylylene diisocyanate (TMXDI), isophorone diisocyanate (IPDI), hexane-1,6-diisocyanate (HDI), toluene diisocyanate (TDI) isomers, cyclohexane diisocyanate and the like. The isocyanate groups of the preoligomer are then reacted with a hydroxyl- and (meth)acrylate-functionalized compound to provide the urethane (meth)acrylate oligomer. The compound containing a hydroxyl group and a (meth) acrylate group may, for example, be selected from the following: 2-hydroxyethyl (meth)acrylate; 2-hydroxypropyl(meth) acrylate; 2-hydroxybutyl(meth)acrylate; 2-hydroxy 3-phenyloxypropyl(meth)acrylate; 1,4-butanediol mono (meth)acrylate; 4-hydroxycyclohexyl (meth)acrylate; 1,6-hexanediol mono(meth)acrylate; neopentylglycol mono (meth)acrylate; trimethylolpropane di(meth)acrylate; trimethylolethane di(meth)acrylate; pentaerythritol tri(meth) acrylate; dipentaerythritol penta(meth)acrylate; and other hydroxy functional (meth)acrylates such as the hydroxy terminated (meth)acrylate monomers based on caprolactone sold under the brand name TONE by Dow Chemical (e.g. TONE M-100, M-101, and M-20).

Alternatively, a polyether polyol (with a number average molecular weight of from about 400 to about 6000, for example) could be substituted for the polyester polyol in the aforedescribed synthetic procedure. Suitable polyether polyols may be obtained by reaction of low molecular weight polyalcohols (e.g., ethylene glycol, glycerin, 1,4-butanediol, trimethylolpropane) with alkylene oxides (e.g., epoxides such as ethylene oxide, propylene oxide and/or butene oxide). Polytetramethylene glycols prepared by ring-opening polymerization of tetrahydrofuran could also be used.

In yet another embodiment, a (meth)acrylic polyol may be reacted with a polyisocyanate and then with a hydroxy functional (meth)acrylate to provide the urethane (meth)acrylate oligomer. The preparation of such oligomers is described, for example, in U.S. published application 2005-0065310, incorporated herein by reference in its entirety. Suitable urethane (meth)acrylate oligomers are available from commercial sources, including, for example, ECX 6026, PHOTOMER 6210, PHOTOMER 6008, PHOTOMER 6010, PHOTOMER 6019, PHOTOMER 6363, PHOTOMER 6572, PHOTOMER 6891, PHOTOMER 6892 and PHOTOMER 6893-20R from Cognis Corporation and PE230 Block Resin from the Liofol Division of Henkel Corporation. The Sartomer Company also sells a wide variety of urethane(meth)acrylate oligomers, including, for example, CN961, CN962, CN963, CN964, CN965, CN966, CN980, CN981, CN9001, CN9002, CN9004, CN929, CN968, CN9788, CN983 CN984, CN9893, CN996, CN1963, CN972, CN975, CN978, CN9782, CN9783, CN991, CN992, CN994, CN997, and CN999. Other suppliers of suitable urethane (meth)acrylate oligomers include Rahn Inc. (under the brand name GENOMER) and UCB Chemicals (under the brand name EBECRYL). Certain suppliers sell admixtures of urethane (meth)acrylate oligomers and other components that can also be suitable for use in the present invention, provided the other components are also desirable for incorporation into the radiation-curable laminating adhesive or, at a minimum, do not interfere with the intended use and function of the deformable composition. Examples of such admixtures include CN3100 and CN966H90 from Sartomer.

Materials capable of being utilized as the urethane(meth) acrylate oligomer component of the present invention are also described in published United States application US 2004/0127594, incorporated herein by reference in its entirety. See, in particular, structures (I) and (II) of the aforementioned published application.

The deformable composition should contain sufficient (meth)acrylate-functionalized oligomer and/or monomer to allow a selected surface of the sealant article prepared therefrom to be crosslinked/cured by radiation to the desired extent. Such amount will vary depending upon the particular (meth)acrylate-functionalized oligomer(s)/monomer(s) selected, but typically will be at least about 1 weight percent but no greater than about 40 weight percent (e.g., 5-30 weight percent).

Thermally Activatable Free Radical Initiators

In certain embodiments, the deformable composition is comprised of one or more thermally activatable (latent) free radical initiators. Such initiators include substances capable of inducing free radical reactions, in particular organic peroxides including ketone peroxides, diacyl peroxides, peresters, perketals, hydroperoxides and others such as cumene hydroperoxide, t-butyl peroxide, bis(tert-butylperoxy) diisopropylbenzene, di(tert-butyl peroxyisopropyl)benzene, 1,1-di-tert-butylperoxy-3,3,5-trimethylcyclohexane, dicumyl peroxide, t-butylperoxybenzoate, di-alkyl peroxydicarbonates, di-peroxyketals (such as 1,1-di-tert-butylperoxy-3,3,5-trimethylcyclohexane), ketone peroxides (e.g., methylethylketone peroxide), 2,5-dimethyl-2,5-di(t-butylperoxy) hexyne-3, dibenzoyl peroxide, and 4,4-di-tert-butylperoxy n-butyl valerate. The thermally activatable free radical initiator is preferably essentially inert or non-reactive within the temperature range of room temperature through the temperature at which the sealant article is to be fabricated (by extrusion of the deformable composition, for example), e.g., about 25 degrees C. to about 100 degrees C., but is activated by heating to an elevated temperature (for example, a temperature within the range of from about 120 degrees C. to about 200 degrees C.). In one embodiment, the peroxide free radical initiator has a ten minute half life temperature of from about 140 to about 180 degrees C. The aforedescribed free radical initiators are believed to assist in cross-linking the various polymeric components of the deformable compositions of the present invention (in particular, the one or more thermoplastics), thereby improving and/or modifying the physical and/or mechanical characteristics of such compositions and the cured sealant articles obtained therefrom. The deformable composition may, for example, typically contain from about 0.05 to about 5 or about 0.1 to about 2 weight % free radical initiator.

Coagents can be used with peroxides to modify the thermal curing characteristics of the deformable composition. Suitable coagents include, for example, metal salts of unsaturated carboxylic acids having from 3 to 8 carbon atoms. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the coagent is selected from zinc salts of acrylates, diacrylates, methacrylates, and dimethacrylates. In another particular embodiment, the coagent is zinc diacrylate. Although the use of a coagent is optional, typically the deformable composition may comprise up to about 10 weight percent of one or more coagents (e.g., 0.5 to 8 weight percent coagent).

Fillers

In certain embodiments of the invention, the deformable composition contains one or more fillers, especially inorganic fillers in finely divided (powdered) form. Examples of suitable fillers include talc, ground and precipitated chalks, silica, titanium dioxide, magnesium carbonate, barium sulfate, calcium carbonate, calcium-magnesium carbonates, alumina, zirconia, zinc oxides, and other inorganic metal oxides, sulfides, sulfates and carbonates, clays, zeolites, glass beads (including hollow glass microspheres), glass fibers, polymeric fibers, mica, carbon black, barite and silicate fillers of the aluminium-magnesium-calcium type, such as wollastonite and chlorite. In one aspect, the deformable composition contains a substantial amount of one or more fillers, e.g., at least about 20 weight % filler, although typically the composition will not contain more than about 60 weight % filler.

Photoinitiators

Where the deformable composition is to be cured using ultraviolet radiation, the composition additionally preferably contains at least one photoinitiator, which may be employed alone or in combination with a photosensitizer. Suitable photoinitiators are any of those known to those skilled in the art for use with radiation (including visible and ultraviolet light) curable (meth)acrylate systems. Exemplary of such photoinitiators are acetophenone and its derivatives such as dichloroacetophenone, trichloroacetophenone, dialkoxyacetophenone, 2,2-dimethoxy-2-phenylacetophenone and 4-dialkylaminoacetophenone; benzophenone and its derivatives such as 4,4'-bis(dimethylamino)benzophenone (Michler's ketone) and 4,4'-bis(diethylamine)benzophenone; benzil; benzoin and its derivatives such as benzoin alkyl ether; benzyldimethylketal; benzoylbenzoate; alphaacyloxime esters; thioxanthone and its derivatives such as 2-chlorothioxanthone and diethylthioxanthone; azo-compounds such as azobisisobutyronitrile; benzoyl peroxide; camphoquinone; phosphine oxides such as diphenyl-2,4,6-trimethylbenzoylphosphine oxide and the like. Especially preferred photoinitiators include aryl-substituted ketones and benzoyl-substituted phosphine oxides. Examples of commercially available photoinitiators suitable for use in the present invention include DAROCUR 1173, DAROCUR 4265, IRGACURE 651, IRGACURE 2959, and IRGACURE 819. The precise concentration of photoinitiator(s) in the deformable composition is not believed to be particularly critical, although a sufficient amount should be used to effectively accomplish curing of the (meth)acrylate-functionalized oligomers and monomers within the desired period of time upon exposing the composition to light radiation. Typically, photoinitiator concentrations of from about 0.01 to about 5 weight percent (e.g., about 0.1 to about 2 weight percent) are utilized.

Tackifiers

In some cases, it has proved to be of advantage to add at least one tackifier to the deformable composition. In the context of the invention, a "tackifier" is understood to be a resin which makes the deformable composition tacky so that other articles adhere firmly to it after light pressure has been briefly applied. They themselves do not have to be tacky at room temperature. Suitable tackifiers generally have relatively low number average molecular weights of around 200 to 3,000, with relatively broad molecular weight distributions. Reactive and well as non-reactive tackifiers may be utilized. Exemplary types of tackifiers include rosin derivatives (e.g., derivatives of wood rosins and tall oil rosins, including hydrogenated and/or esterified derivatives thereof), coumarone-indene resins, terpene oligomers, aliphatic petroleum resins (including the hydrocarbon resins obtained by oligomerization of the C5 and C6 fractions of petroleum and hydrogenated derivatives thereof), copolymers of alpha-methylstyrene and vinyltoluene, and alkyl-modified phenolics. Especially suitable reactive tackifiers include liquid diene polymers and copolymers (e.g., liquid polybutadienes), particularly those having a relatively high (e.g., over 70%) vinyl content.

Although the deformable composition does not necessarily need to include a tackifier, typically tackifiers will be used at a concentration of at least 0.5 weight percent but no more than about 20 weight percent (e.g., 1 to 12 weight percent).

Other Components

The deformable compositions of the present invention may also contain one or more additional components or additives, such as, for example, colorants, pigments, plasticizers, processing aids, organic acids (e.g., fatty acids), anti-oxidants, stabilizers, thixotropic agents, thickeners, reactive diluents, adhesion promoters, coupling agents, and the like. Radiation absorbers or blocking agents may be incorporated into the deformable composition for the purpose of limiting the depth of radiation cure in the sealant article, e.g., controlling such curing so that substantially only the deformable composition on and immediately proximate to the selected surface is fully cured.

In one aspect of the invention, the deformable composition is free or essentially fi-e of any volatile organic compounds (VOCs) such as solvents and the like. The deformable composition may also be formulated such that it is free or essentially free of epoxy compounds.

In one aspect of the invention, the deformable composition corresponds to the following composition (the amounts being expressed as weight % of the total weight of the deformable composition, it being understood that additional components besides those mentioned below may also be present):

| | |
|---|---|
| Ethylene/Vinyl Acetate Copolymer(s) and/or Polyester(s) | 20-45 |
| Reactive Tackifier(s), e.g., Liquid Polybutadiene(s) | 1-12 |
| (Meth)acrylate-Functionalized Monomer(s) and/or Oligomer(s), e.g., Epoxy (Meth)acrylate(s) and/or Urethane (Meth)acrylates | 5-30 |
| Inorganic Particulate Filler(s) | 25-55 |
| Organic Peroxide(s) | 0.1-2 |
| Photoinitiator(s) | 0.1-2 |

The composition may be blended, extruded into a sealant article having a specific desired shape such as a tape, and then exposed to a source of radiation such as ultraviolet light or electron beam radiation under conditions effective to cure (crosslink) one surface of the sealant article to an extent sufficient to render such surface resistant to deformation while leaving the opposite surface of the sealant article essentially uncured and still capable of being readily deformed. The sealant article may then be applied over a substrate such as a welded metal joint (as might be found in a vehicle roof ditch, for example) and pressed into position such that at least a portion of the deformable opposite surface of the sealant article is in contact with at least a portion of the substrate surface. The sealant article can be exposed to a temperature effective to cause the deformable composition to thermally cure and to come into closer conformance with the substrate surface through softening/melting of the deformable composition. The substrate surface is thereby effectively sealed. Prior to heating of the sealant article, the deformation-resistant, radiation-cured surface of the sealant article helps to make the sealant article easier to handle and manipulate than an analogous sealant article where such surface has not been cured by exposure to radiation. Additionally, the radiation cured surface, which is typically positioned facing away from the substrate surface to which the sealant article is applied, improves the resistance of the sealant article towards being deformed due to air trapped beneath the sealant article or blown through the substrate to be sealed (e.g., where the substrate surface includes one or more openings) or due to an uneven substrate surface.

EXAMPLES

Example 1

A deformable composition in accordance with the present invention may be formulated using the following components (the amounts being expressed as weight percent based on the total weight of the deformable composition):

| | |
|---|---|
| Ethylene/Vinyl Acetate Copolymer[1] | 33.25 |
| Liquid Polybutadiene[2] | 5.54 |
| Epoxy (Meth)acrylate[3] | 16.07 |
| Carbon Black | 0.01 |
| Barium Sulfate | 27.71 |
| Calcium Carbonate | 16.62 |
| Peroxide[4] | 0.36 |
| Photoinitiator[5] | 0.44 |

[1]11.08% ELVAX 205W (DuPont) and 22.16% K2102
[2]RICON 154 (Sartomer)
[3]EBECRYL 3700 (UCB)
[4]0.03% VULCUP + 0.33% VAROX 130-XL dialkyl. 2,5-dimethyl-2,5-Di-(t-butylperoxy) hexyne-3 (R. T. Vanderbilt)
[5]IRGACURE 651 alpha, alpha-dimethoxy-alpha-phenylacetophenone (Ciba)

The components may be mixed at a temperature of from about 70 degrees C. to about 90 degrees C. using any suitable conventional mixer of the type utilized in the plastics and rubber industry. The deformable composition may be formed into a relatively thin, flat sheet and then surface-cured on one side of the sheet by exposing the sheet to ultraviolet radiation. For example, in a laboratory environment, a single UV lamp having an output of 0.82 W/cm$^2$, 0.350 J/cm$^2$, at slowest setting may be utilized. In a production environment, three lamps having an output of 0.112 W/cm$^2$, 0.431 J/cm$^2$, at a speed of 350 inches per minute may be used. The sealant article thereby obtained may be applied to a substrate surface, with the surface-cured side of the sheet facing away from the substrate surface, and then heated at a temperature of from about 325 degrees F. (165 degrees C.) to about 375 degrees F. (190 degrees C.) to soften the uncured portion of the sealant article in contact with the substrate surface, thereby accomplishing effective sealing of such surface. Heating at such temperature also activates the organic peroxide and promotes thermal crosslinking/curing of the deformable composition, in particular the polymeric components of the composition such as the ethylene/vinyl acetate copolymer.

Example 2

Another deformable composition in accordance with the present invention may be formulated using the following components (the amounts being expressed as weight percent based on the total weight of the deformable composition):

| | |
|---|---|
| Barium Sulfate | 27.93 |
| Calcium Carbonate | 16.76 |
| Ethylene Vinyl Acetate Copolymer[1] | 33.51 |
| Polybutadiene | 5.59 |
| Urethane (Meth)acrylate[2] | 15.08 |
| Carbon Black | 0.01 |
| Organic Peroxide[3] | 0.67 |
| Photoinitiator[4] | 0.45 |

[1]18.43% EVATANE 33-400 (Arkema) + 15.08% ELVAX 46 (DuPont)
[2]5.03% CN 991 + 10.05% CN 965 (Sartomer)
[3]0.45% LUPERCO 130XL (Arkema) + 0.22% VAROX 230XL (R. T. Vanderbilt)
[4]IRGACURE 651 (Ciba)

The deformable composition thereby obtained has improved moisture/humidity resistance, as compared to the composition of Example 1, but exhibits similar radiation curing, thermal curing, and melt flow characteristics. Absorption of water during storage under ambient conditions tends to cause the deformable composition to expand when baked, which normally is undesirable. It is believed that the marked and unexpected improvement in humidity/moisture resistance exhibited by the composition of Example 1 is due to the use of urethane (meth)acrylate in place of the epoxy (meth) acrylate in the composition of Example 1.

Example 3

A deformable composition in accordance with the present invention may be formulated using the following components (the amounts being expressed as weight percent based on the total weight of the deformable composition):

| | |
|---|---|
| Zinc Diacrylate | 3.94 |
| Calcium Carbonate | 32.80 |
| Copolyester[1] | 22.96 |
| Ethylene Vinyl Acetate Copolymer[2] | 16.40 |
| Polybutadiene[3] | 2.62 |
| Urethane (Meth)Acrylate[4] | 19.68 |
| Carbon Black | 0.01 |
| Stearic Acid | 0.39 |
| Organic Peroxide[5] | 0.66 |
| Photoinitiator[6] | 0.52 |

[1]DYNAPOL S1402 (Degussa)
[2]ELVAX 46 (DuPont)
[3]RICON 154 (Sartomer)
[4]9.84% CN 991 + 9.84% CN 965 (Sartomer)
[5]VAROX 230XL (R. T. Vanderbilt)
[6]IRGACURE 651 (Ciba)

The deformable composition can be formed into a sheet and surface-cured on one side by exposure to radiation in accordance with the procedures described in Example 1. The sealant article thereby obtained may be applied to a substrate surface, with the surface-cured side of the sheet facing away from the substrate surface, and then heated at a temperature of from about 255 degrees F. (125 degrees C.) to about 320 degrees F. (160 degrees C.) to soften the uncured portion of the sealant article in contact with the substrate surface, thereby accomplishing effective sealing of such surface. The sealant article also undergoes thermal curing within this temperature range, as certain components contained in the sealant article experience a thermoset reaction when so heated.

What is claimed is:

1. A sealant article useful for sealing a substrate surface and having a first surface and a second surface, wherein said first surface is comprised of a deformable composition that is capable of conforming to a substrate surface when subjected to heat and/or pressure and is comprised of at least one thermoplastic, at least one (meth)acrylate-functionalized monomer or oligomer selected from the group consisting of epoxy (meth)acrylates and urethane (meth)acrylates, at least one thermally activatable free radical initiator, and at least one inorganic filler in finely divided form and said second surface of said sealant article has been at least partially cured by exposing said second surface to an amount of radiation effective to induce at least partial curing of said second surface of said sealant article, wherein said second surface prior to said curing is comprised of said deformable composition and wherein said at least partial curing is effective to render said second surface less deformable than said first surface and is controlled so that substantially only the deformable composition on and immediately proximate to the second surface is fully cured, thereby forming a thin film upon the second surface.

2. The sealant article of claim 1, wherein said deformable composition comprising said first surface flows and substantially covers a desired area of said substrate surface when said sealant article is heated to a temperature effective to cause said deformable composition to flow.

3. The sealant article of claim 1, wherein said at least one filler is selected from the group consisting of talc, ground and precipitated chalks, silica, titanium dioxide, magnesium carbonate, barium sulfate, calcium carbonate, calcium-magnesium carbonates, alumina, zirconia, zinc oxides, clays, zeolites, mica, carbon black, wollastonite, and chlorite.

4. The sealant article of claim 1, wherein said sealant article has been formed by extrusion prior to said at least partial curing of said second surface of said sealant article.

5. The sealant article of claim 1, wherein said second surface of said sealant article has been cured to an extent effective to render said second surface capable of substantially limiting said deformable composition to a desired area of said substrate surface when the sealant article is heated to a temperature effective to cause said deformable composition to flow.

6. The sealant article of claim 1, wherein said deformable composition is capable of being thermally cured by heating to a temperature above room temperature and said second surface of said sealant article has been cured to an extent effective to render said second surface resistant to melt flow when heated to a temperature effective to thermally cure said deformable composition.

7. A combination comprised of a substrate and the sealant article of claim 1, wherein said first surface is in at least partial contact with said substrate surface and said second surface faces away from said substrate surface.

8. A method of sealing a substrate, said method comprising applying a sealant article in accordance with claim 1 to said substrate surface such that said first surface is in at least partial contact with said substrate surface.

9. The method of claim 8, comprising an additional step of exerting an amount of pressure on said sealant article effective to conform said first surface more closely to said substrate surface.

10. The method of claim 8, comprising an additional step of heating said sealant article to a temperature effective to cause said first surface to conform more closely to said substrate surface.

11. The sealant article of claim 1, wherein the deformable composition additionally comprises at least one tackifier.

12. The sealant article of claim 1, wherein the deformable composition additionally comprises at least one reactive tackifier.

13. The sealant article of claim 1, wherein the deformable composition additionally comprises at least one liquid diene homopolymer or copolymer containing pendant vinyl groups.

14. The sealant article of claim 1, wherein the deformable composition comprises at least one thermally activatable free radical initiator selected from the group consisting of organic peroxides.

15. The sealant article of claim 1, wherein the deformable composition comprises at least one thermoplastic copolymer of ethylene and at least one comonomer selected from the group consisting of vinyl acetate, (meth)acrylic acid, and C1 to C6 alkyl esters of (meth)acrylic acid.

16. The sealant article of claim 1, wherein the deformable composition comprises at least one thermoplastic that is an ethylene/vinyl acetate copolymer.

17. The sealant article of claim 1, wherein the deformable composition additionally comprises at least one photoinitiator.

18. The sealant article of claim 1, wherein the deformable composition comprises:

| | |
|---|---|
| Ethylene/Vinyl Acetate Copolymer(s) and/or Polyester(s) | 20-45 |
| Tackifier(s) | 1-12 |
| Epoxy (Meth)acrylate(s) and/or Urethane (Meth)acrylate(s) | 5-30 |
| Inorganic Particulate Filler(s) | 25-55 |
| Organic Peroxide(s) | 0.1-2 |
| Photoinitiator(s) | 0.1-2 | wherein the amount of each component is expressed in weight percent based on the total weight of the deformable composition.

* * * * *